G. A. SHAW.
PNEUMATIC TIRE.
APPLICATION FILED OCT. 22, 1912.
1,065,849.
Patented June 24, 1913.
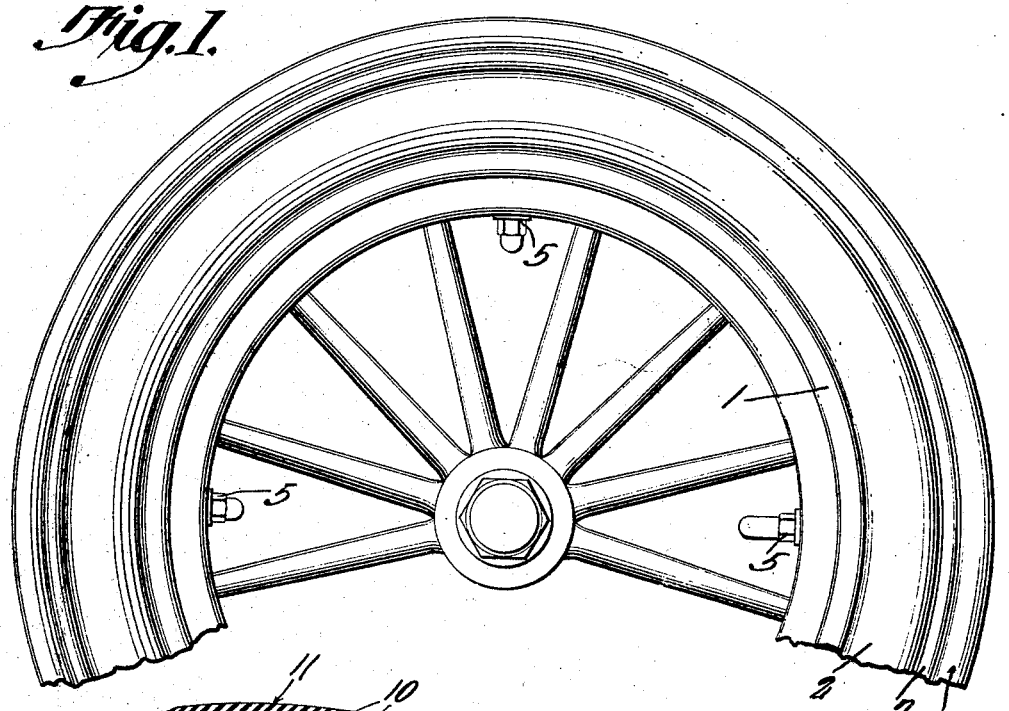
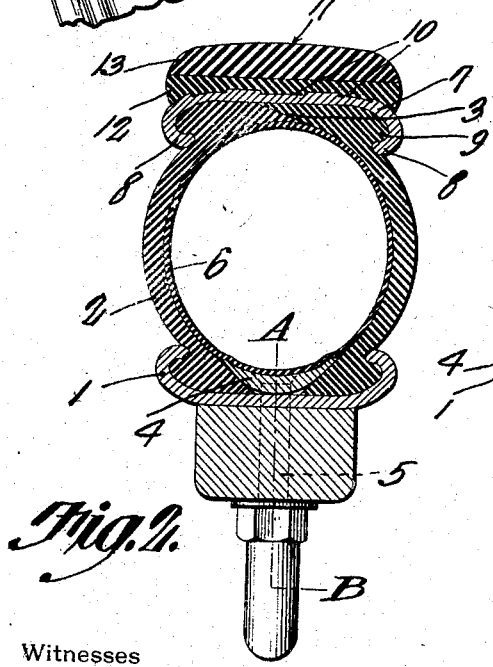
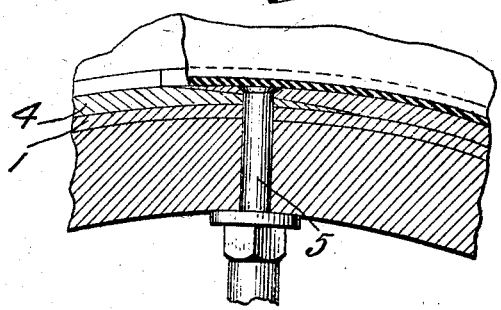
Witnesses
George A. Shaw, Inventor
by C. A. Snow & Co., Attorneys

UNITED STATES PATENT OFFICE.

GEORGE A. SHAW, OF BARBERTON, OHIO.

PNEUMATIC TIRE.

1,065,849.

Specification of Letters Patent.

Patented June 24, 1913.

Application filed October 22, 1912. Serial No. 727,241.

*To all whom it may concern:*

Be it known that I, GEORGE A. SHAW, a citizen of the United States, residing at Barberton, in the county of Summit and State of Ohio, have invented a new and useful Pneumatic Tire, of which the following is a specification.

This invention relates to pneumatic tires and is more particularly designed as an improvement upon the structure disclosed in an application filed by me on November 27, 1911, Serial No. 662,721.

One of the objects of the invention is to provide a tire the outer casing of which is split along its outer or peripheral portion and is adapted to be held together normally by means of a non-flexible shield carrying a tread of soft material and which constitutes an integral part thereof.

A further object is to provide improved means whereby the tire is fastened securely to the wheel rim.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a side elevation of a portion of a wheel having the tire in position thereon. Fig. 2 is an enlarged transverse section through the tire and adjacent parts. Fig. 3 is a section on line A—B Fig. 2.

Referring to the figures by characters of reference 1 designates the rim of a wheel, the same engaging the outer tube or casing 2 of the tire in the usual manner. This casing 2 is preferably split longitudinally along its tread or peripheral portion, the two sections thus formed being lapped as shown at 3. The sections may be securely held to the rim 1 by means of a steel band 4 preferably formed of two sections and which sections are connected to the rim by means of suitably arranged bolts 5. As shown particularly in Fig. 2, the band 4 is substantially semi-elliptical in cross sectional contour so that, when it is tightened in position, it presents broad bearing surfaces to the casing sections 2 and serves to hold the sections positively against displacement relative to the rim 1. Inasmuch as the casing is made of two separate sections, it will be seen that by spreading these sections apart along their outer edges, the band sections 4 can be easily placed in or removed from position. The inner tube of the tire has been indicated at 6 and bears against the band 4.

For the purpose of holding the outer portions of the casing sections 2 in proper relation to each other, a combined tread and shield is provided. The same consists of a non-flexible ring 7 preferably formed of steel and having edge portions rolled inwardly, as at 8, to form jaws. These jaws are adapted to engage beads 9 formed upon the outer portions of the sections of casing 2. When the beads are in engagement with the jaws 8 the lapping portions 3 of the casing sections are held in proper relation to each other. Obviously, by inflating the inner tube 6, the peripheral portions of the sections 2 are caused to press firmly against the unyielding ring 7 and against the inturned portions or jaws 8.

Annular channels 10 are formed in the outer transversely convexed surface of the ring 7 and extending around the ring and projecting into these channels is the inner portion of the tread proper, said inner portion being preferably formed of hard rubber filling the channels 10 and extending over the outer surface of the ring throughout the extent thereof. The outer portion of the tread is formed preferably of soft rubber integral with the hard rubber. In the drawings, the tread proper has been indicated generally at 11 and the hard rubber portion thereof has been shown at 12 while the soft surface engaging portion has been indicated at 13. It has been found in practice that the inner hard rubber portion of the tread can be vulcanized onto the metal ring 7 so that said ring and the tread 11 thus constitute an integral body receiving practically all of the wear and tear to which the tire is subjected. It will be noted that the inner surface of the hard rubber portion 12 is concaved transversely so as thus to fit snugly upon the convex surface of the ring
7. Thus, when the tire is subjected to lateral pressure as, for example, when the vehicle to which it is connected is turning a corner, the thrust is along lines extending through the ring 7 and there is no danger of the tread 11 being forced laterally upon ring 7 and thus shearing off those portions of the hard rubber seated in the channels 10. Thus while the rubber in the channels tends, to a certain degree, to hold the tread against lateral displacement on the ring 7, it operates primarily as a mere anchoring means.

It will be apparent that by simply deflating the tire, the lapping portions of casing 2 can be pressed toward each other out of engagement with the inturned portions or jaws 8 whereupon ring 7 and tread 11 can be easily detached from the tire.

What is claimed is:—

A pneumatic tire including a casing having an annular peripheral opening and an inner opening, said openings dividing the casing into two separate oppositely disposed parts, the inner portions of the parts being spaced, a non-flexible ring bearing flat upon the periphery of the casing and having inturned marginal portions fitting snugly against the sides of the casing to hold the outer portions of the casing together, said ring being formed in a single piece free of lateral projections and having a transversely convexed outer surface, a tread extending around the non-flexible ring and having its inner surface concaved transversely to embrace the non-flexible ring and engage the convexed surface of said ring, a ring bearing upon the inner surfaces of the casing sections for holding the inner edges of said sections spaced apart and in engagement with a wheel rim, and an inflatable inner tube within the casing and bearing upon the inner ring.

In testimony that I claim the foregoing as my own, I have hereto affixed my signature in the presence of two witnesses.

GEORGE A. SHAW.

Witnesses:
SELINA WILLSON,
MONROE E. MILLER.